United States Patent

[11] 3,559,846

| | | |
|---|---|---|
| [72] | Inventor | Niels Erik Hastrup<br>Copenhagen-Valby, Denmark |
| [21] | Appl. No. | 810,546 |
| [22] | Filed | Mar. 26, 1969 |
| [45] | Patented | Feb. 2, 1971 |
| [73] | Assignee | F. L. Smidth & Co.<br>New York, N.Y.<br>a corporation of Delaware |
| [32] | Priority | Apr. 8, 1968 |
| [33] | | Great Britain |
| [31] | | 16,859 |

[54] FEEDING APPARATUS FOR PULVERULENT OR GRANULAR MATERIAL
6 Claims, 3 Drawing Figs.

[52] U.S. Cl.................................................. 222/55, 302/12
[51] Int. Cl.................................................. B67d 5/08

[50] Field of Search.......................................... 302/12, 17, 33, 50, 53; 198/37, 45, 62, 111, 112, 122; 221/278, (Inquired); 222/53, 55, 152

[56] References Cited
UNITED STATES PATENTS

| 1,460,466 | 7/1923 | Worsham..................... | 302/12 |
| 2,764,316 | 9/1956 | Sylvest........................ | 222/55 |
| 3,087,652 | 4/1963 | Smith, Jr. .................... | 222/55 |

*Primary Examiner*—Evon C. Blunk
*Assistant Examiner*—Alfred N. Goodman
*Attorney*—Pennie, Edmonds, Morton, Taylor and Adams ABSTRACT: Apparatus for feeding pulverulent or granular material, especially such material which is of a fluidized nature, wherein the material is discharged from the feeding apparatus at approximately a constant rate, as is important in the feeding of cement raw material or raw meal to a rotary kiln in the manufacture of cement.

PATENTED FEB 2 1971

3,559,846

INVENTOR
NIELS E. HASTRUP

BY Pennie, Edmonds,
Morton, Taylor & Adams

ATTORNEYS

FEEDING APPARATUS FOR PULVERULENT OR GRANULAR MATERIAL

BACKGROUND OF THE INVENTION

The cement raw meal or other pulverulent or granular material is almost invariably in a partly fluidized state because of aeration resulting from subjecting the material to prior pneumatic conveyance or prior homogenization with the addition of air in finely divided streams. Even a prior conveyance of such material by means of a screw conveyor normally implies that a good deal of atmospheric air has unintentionally been whipped into the material during the conveyance. As the trapped air takes a long time to escape from the material, the material will retain its fluidized characteristics for some considerable period and this makes it difficult to convey the material at a steady rate since the material is liable to "shoot" and to travel in surges.

SUMMARY OF THE INVENTION

In accordance with the present invention the material is supplied in at least a partly fluidized condition to an inlet at the lower end of a closed inclined duct having an outlet to at its upper end and incorporating a conveying device for carrying material up the duct. The material is supplied to the inlet under an approximately constant pressure head approximately equal to the effective height of the duct between its inlet and outlet so that under the influence of the hydrostatic pressure in the material and the conveying device the material moves up the duct to the outlet and is discharged at a nearly constant rate.

Preferably the conveying device is in the form of an endless belt conveyor which constitutes the lower wall of the closed duct.

The principle behind the invention is that to the extent the material acts as a fluid under the combined influence of the hydrostatic pressure and the conveying device, it will tend to rise up the duct to equalize the pressure at the duct-inlet. This effectively eliminates surge movement from the mass of material so that the material may be evenly discharged from the duct outlet. The conveyor provides a gentle agitation of the material throughout the length of the duct and a frictional entrainment of the material assisting the internal pressure in the material to cause the material to flow to the top of the duct. In addition the conveyor provides a steady entrainment of the material at the duct outlet and causes an even discharge.

The duct is preferably inclined at 15° to the horizontal for the feeding of cement raw meal to a rotary kiln.

The speed of the belt conveyor may be varied to control the discharge rate of the material from the duct and to compensate for variations in the specific gravity of the material. This may be achieved automatically by arranging for the duct to be mechanically balanced so that the weight of the material in the duct at any time can be sensed, and controlling the rate of discharge of the material from the duct outlet by varying the speed of the conveyor or otherwise, the material thus being discharged at a substantially constant rate by weight.

According to the invention the duct is provided by an inclined belt conveyor having an upwardly moving run to which an overlying cover is sealed from end to end. The duct has an inlet at its lower end and an outlet at its upper end. A shaft or vertical conduit is connected at its lower end to the duct inlet and any suitable means is arranged to supply the material to the upper portion of the shaft. The height of material in the shaft is maintained approximately equal to the height between the duct inlet and outlet.

The material to be supplied to the shaft will normally be in a partly fluidized condition. However, if the material is fed to the shaft in an undesirably viscous condition, air nozzles may be incorporated in the shaft in order partly to fluidize the material during its s downward movement in the shaft and on entering the duct.

If the rate of the material discharge from the duct outlet is to be maintained approximately constant by weight as an automatic result of the weight of material at any time on the conveyor within the duct, the conveyor is mounted so as to pivot about a horizontal axis and is mechanically balanced the duct inlet being connected through a flexible seal to the lower end of the shaft, and a sensing device is provided which responds to the weight of material on the conveyor, the response of the sensing device being arranged to control the speed of the conveyor.

Preferably the sensing device is a weight responsive cell such that variations in the weight on the conveyor produce variations in pressure on the cell proportional thereto. The result is a continuous variation in the conveyor speed with only a negligable pivotal movement of the conveyor. The variation in the pressure on the cell will produce variations in the electrical resistance of the cell so that the strength of a current passing through the cell is varied correspondingly. The electric current passing through the cell is utilized for controlling an element which controls the speed regulator for the driving motor of the conveyor.

The means for maintaining the required level of material in the shaft may comprise a worm conveyor which is capable of feeding into the top of the shaft a quantity of material greater than that which the band conveyor is capable of discharging from the duct, together with an overflow in shaft at the required upper level for the material.

One embodiment of an apparatus constructed and arranged to operate in accordance with the invention is illustrated in the accompanying drawings in which:

DESCRIPTION OF THE PREFERRED EMBODIMENT

Figure 1:
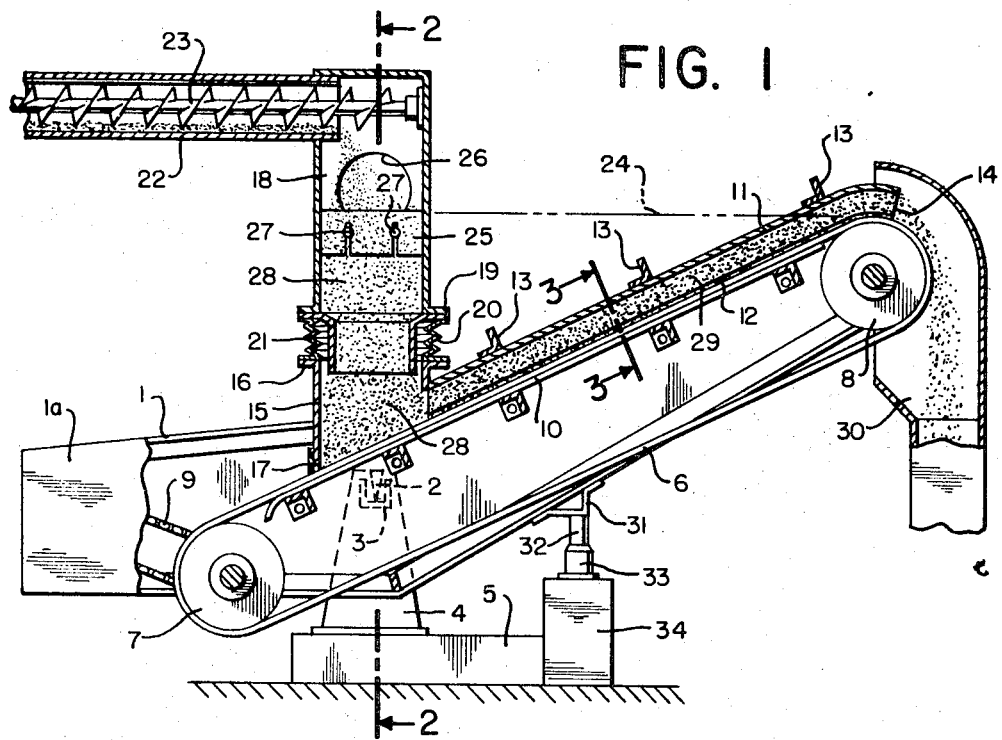
FIG. 1 is a side elevation with most parts in vertical central section.

The apparatus has a frame 1 made of sectional iron and steel plate which supports the endless belt conveyor. Frame 1 is pivotally supported on two knives 2 disposed opposite each other one on each side of the frame. These knives rest in bearings 3 mounted on supports 4 which rest on foundations 5.

The conveyor frame 1 carries an endless belt 6 passed around two rollers 7 and 8 of which the former is driven by means of a chain drive 9 and suitable gearing from an electromotor (not shown). In FIG. 1 the motor and gearing are concealed behind the wall 1a of a casing constituting a part of conveyor frame 1. In the casing there are also displaceable weights (not shown) by means of which the conveyor may be balanced so as to be in equilibrium in the position illustrated in FIG. 1. The upper run of the conveyor belt 6 is supported by a plate 10 in order to prevent it from being pressed down by the weight of the material conveyed in the inclined upward direction by the conveyor band during its operation.

Along a substantial part of its path in the direction of conveyance the upper run of the conveyor belt is provided with a cover 11 with downward-bent edges 11a so that the belt and the cover define between them a closed duct. The downwardly-bent edges of the cover are sealed to the conveyor band by seals 12 of flexible material. The cover is welded to supporting irons 13 above, which are attached to the frame 1 of the conveyor. The cover 11 has no downward-bent edge transversely to the direction of the conveyance at the upper end of the band conveyor, and so at this point a forward-directed outlet opening 14 from the duct is formed.

At the lower end of the cover 11 there is provided an inlet opening to the duct. The inlet faces upwards, and is provided with an upwardly directed collar 15 of a rectangular cross section and having a horizontal finishing flange 16. A seal 17 of flexible material rests in contact with the conveyor band 16 at the point where the a band passes beneath the collar 15 which is disposed in such manner that at its vertical plane of symmetry it has a plane passing through the knives 2.

Above the collar 15 and slightly spaced from it is a shaft or conduit 18 of the same cross section as the collar 15 and having the same plane of symmetry. The shaft 18 therefore constitutes an upward extension of collar 15. At its lower end shaft 18 terminates in a horizontal flange 19, and between the flanges 16 and 19 is provided a bellows 20 made of a flexible material and closing a gap between the collar 15 and the shaft 18 whilst permitting a certain amount of relative movement of the conveyor in relation to the stationary shaft. A square protection tube 21 attached to the flange 19 extends from the shaft 18 down into the collar 15 so as to protect the bellows 20 against wear by the material passing from the shaft into the collar.

Figure 2:
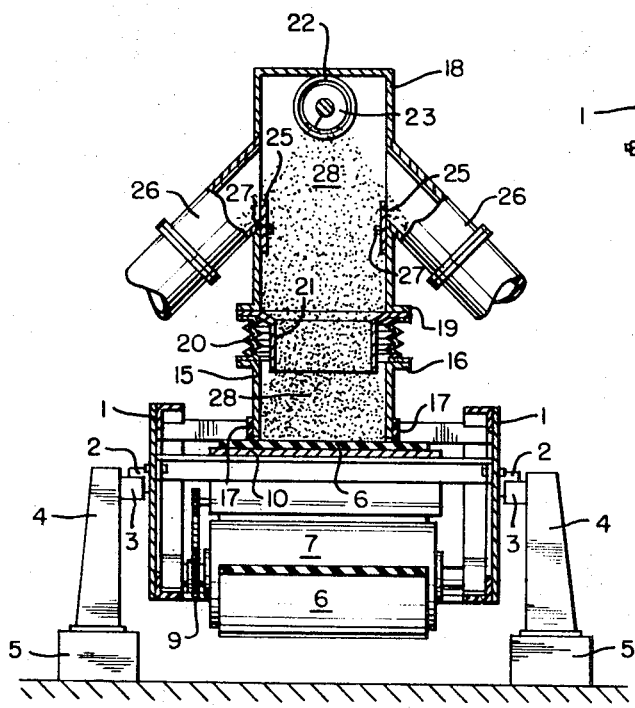
FIG. 2 is a section taken on the line 2–2 of FIG. 1.
Figure 3:
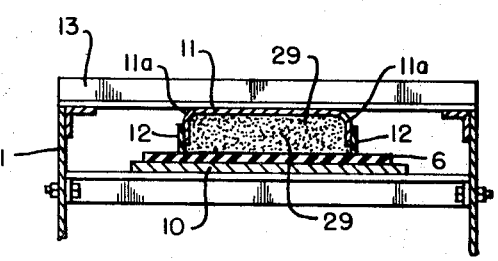
FIG. 3 is a section a larger scale taken on the line 3 of FIG. 1.

At the upper end of shaft 18 a worm conveyor 23 is mounted in a casing 22 for feeding material into the shaft. Such material is aerated to the extent and in the sense described above, will drop into shaft 18, forming a column of material. The material in the shaft is prevented from exceeding the level indicated in FIGS. 1 and 2 by level line 24 which is a tangent to the conveyor belt 6 at its upper point. In order that the level may be maintained regardless of the quantity of material by weight removed by the band conveyor per unit of time from the lower end of the column of material in shaft 18 the worm conveyor 23 is made capable of conveying from a reservoir of material (not shown) more material than the conveyor belt 6 is capable of conveying. Inside shaft 18 are also mounted two plates 25 above the upper edge of which, located in the level line 24, the excess material may overflow into two inclined pipes 26. The excess material may be returned by means (not shown) to the material reservoir (also not shown). Adjustment of the level defined by the line 24 is made by shifting the plates 25 which are attached to the interior of shaft 18 by means of bolts 27 passing through slots provided in plates 25.

The column of material located at any given time inside the collar 15 and the shaft 18 is denoted by numeral 28, whereas the layer of material located at any given time in the duct between the conveyor band 6 and the cover 11 is denoted by numeral 29. The material in the column 28 and the layer 29 is, during the operation of the apparatus, constantly moving down shaft 18 and up along the moving conveyor 6. Under these circumstances the partly fluidized material will behave almost as a liquid flowing in communicating vessels, represented on one hand, by shaft 18 and collar 15 and, on the other hand, by the duct formed between the conveyor belt 6 and the cover 11.

The material leaves the apparatus in a uniform flow consisting of a predetermined quantity by weight per unit of time through the outlet opening 14 and is caught by a hopper 30 which surrounds the upper free end of the belt conveyor. From the hopper the material passes to a rotary kiln or whatever apparatus is intended for receiving the material.

For the purpose of controlling the belt speed parts 31. 31, 32, 33 and 34 are provided. Part 31 is a bracket on the under side of the conveyor belt 6. Bracket 31 is joined to a short bar 32 which bears on a device 33 resting on a foundation 34. The electrical resistance of device 33 varies with the downward force applied to it. In this way the belt conveyor performs virtually no tilting movements of the kind mentioned above. Instead the device 33 is subjected to a downward force the amount of which depends upon the weight on conveyor belt 6 at any given time so that the greater the specific gravity of the material, the larger the downward force. This varying force alters the electrical resistance of the device or cell 33 in a known manner and the alterations in resistance are utilized for continuously controlling the speed of the conveyor belt by varying the speed of its driving motor (not shown) to maintain a constant discharge rate by weight of material from the outlet 14.

The wall of the collar 15 may be provided, above the seal 17, with inwardly facing nozzles (not shown) to which flexible compressed air lines are attached for blowing atmospheric air into the material dropping down the shaft. This is useful if the material fed to the shaft, instead of being aerated, is unduly viscous and needs to be fluidized before passing into the duct.

I claim:

1. Apparatus for feeding pulverulent or granular material at an approximately constant rate comprising a closed inclined duct having as its bottom surface a conveying device, said duct having an inlet at its lower end and an outlet at its upper end, means for supplying said material to the inlet of the duct under an approximately constant pressure head approximately equal to the effective height of the inclined duct between its inlet and outlet, the material being moved upwardly in said duct and discharged therefrom partly by the influence of the pressure head and partly by the action of the conveying device.

2. Apparatus according to claim 1 in which the conveying device is an endless belt.

3. Apparatus according to claim 1 including means for pivotally supporting said duct including the conveying device in a mechanically balanced condition, and sensing means actuated by the pivoted supporting means, the sensing means being arranged to control the speed of operation of the conveying device to cause the material to be discharged from the outlet of the duct at an approximately constant rate by weight.

4. Apparatus according to claim 1 in which the closed duct comprises an inclined conveyor belt having an upwardly moving run with an overlying cover, the means for supplying material to the duct inlet comprising an upright shaft connected at its lower end to the duct inlet, means for supplying the material to the shaft, and means for adjusting the level of material in the shaft approximately to equal the height between the duct inlet and outlet.

5. Apparatus according to claim 4, in which means is provided for maintaining the required level of material in the shaft comprising a worm conveyor which is capable of feeding into the top of the shaft material at a greater rate than the conveyor is capable of discharging from the duct, and overflow means in the shaft at the required level of the material.

6. A Apparatus according to claim 4 in which the duct is pivotally supported and the inlet to the pivotally supported duct comprises a collar fixed to the lower end of the duct, the collar being coupled to the lower end of the upright shaft through a bellows.